Figure 1:
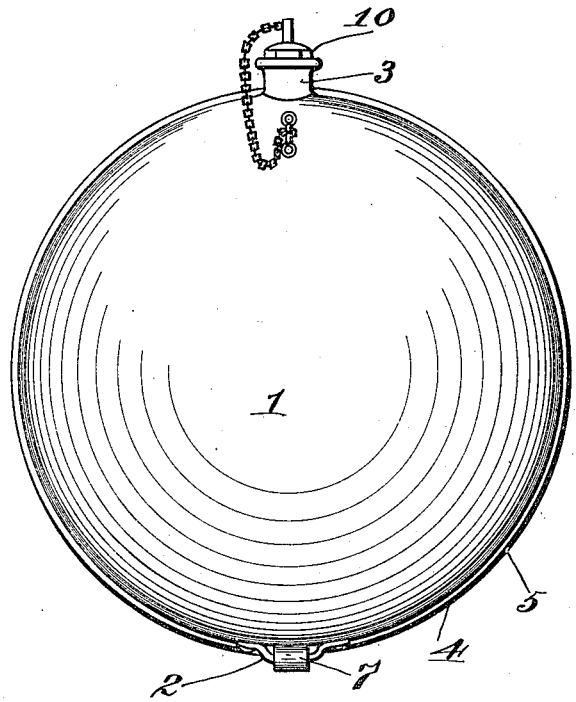

B. HARRIS.
CANTEEN AND BASIN.
APPLICATION FILED MAR. 7, 1918.

1,278,461.

Patented Sept. 10, 1918.

Witnesses,

Inventor
Billups Harris
By Edwin F. Samuels
Attorney

UNITED STATES PATENT OFFICE.

BILLUPS HARRIS, OF BALTIMORE, MARYLAND.

CANTEEN AND BASIN.

1,278,461.

Specification of Letters Patent.  Patented Sept. 10, 1918.

Application filed March 7, 1918.  Serial No. 220,967.

*To all whom it may concern:*

Be it known that I, BILLUPS HARRIS, a citizen of the United States, and resident of the city of Baltimore, State of Maryland, have invented certain new and useful Improvements in Canteens and Basins, of which the following is a specification.

This invention relates to a combination water flask and hand basin particularly adapted for use by automobilists. The object is to combine in a single unit a convenient container for a sufficient supply of water for ablutions *en route* with a suitable hand basin, the two being adapted to be nested and fastened together for transportation. In the present instance, the desired result is accomplished by the provision of a canteen or water bottle which is circular or substantially circular as to its periphery and elliptical or approaching elliptical as to a section taken on any diametrical plane through the axis. With this can is combined a basin corresponding to and adapted to fit over one-half of the flask, that is, the hand basin is circular, the rim of the basin being adapted to receive and inclose the circular peripheral portion of the canteen. The curve of the bottom of the basin is preferably shaped to fit the curve of the side; under any circumstances, it is sufficiently deep to admit the side of the canteen. That is, the two parts, the canteen and basin, are adapted to nest laterally, the basin fitting over and receiving the shallow, flatly curved side of the canteen or bottle.

In the preferred form, the canteen is made with a filler opening at one end of a long diameter of the circular periphery, adapted to receive a plug, and a loop at the opposite end of the same diameter, and the basin is made with a hook at one end of a long diameter and a loop at the other end. The hook on the basin passes through and engages the loop on the canteen and when the parts are closely nested, the loop on the basin registers with the mouth of the bottle neck or filler opening, the plug being passed through the loop into the neck to close the opening to prevent escape of water and to lock the parts, that is, the basin and bottle, in nested position.

Figure 2:
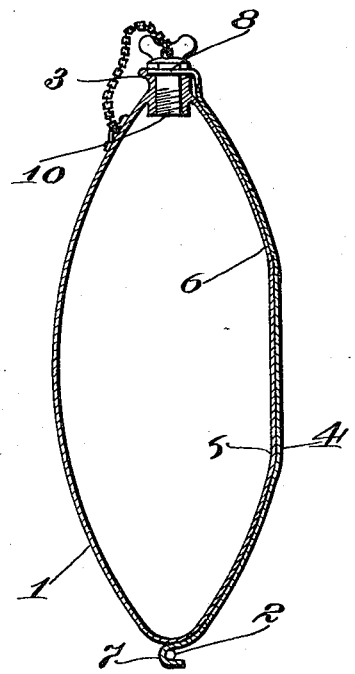
Figure 3:
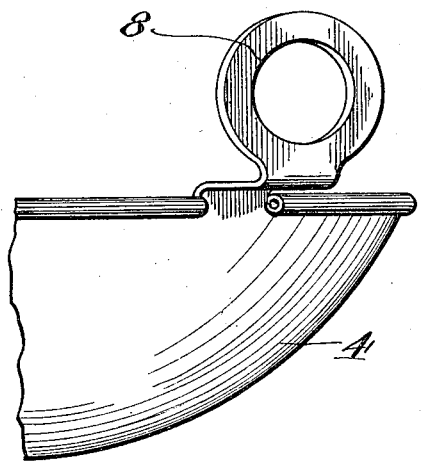

In the accompanying drawing I have illustrated a coöperating, nesting hand basin and canteen or water bottle embodying the features of my invention. In the drawing, Figure 1 is a side elevation of the water bottle showing the circular outline, the rim of the basin being shown inclosing the bottle;

Fig. 2 is a transverse section of the canteen and basin combined, the plane of the section including the axis and the diameter passing through the filler opening and hook; and Fig. 3 is a fragmentary elevation of the periphery of the basin, showing the loop or ring thereon.

Referring to the drawings by numerals, the water bottle or canteen 1 having a circular periphery as shown in Fig. 1, and an elliptical or practically elliptical cross-section on a diametrical plane through the axis of the circular portion as shown in Fig. 2, has a loop 2 at one end of the upright diameter of the circular portion, and a filler opening 3 at the upper or opposite end of such diameter. The basin 4 is circular in outline, *i. e.*, circular as to its rim 5, the basin being of sufficient size and diameter to receive and inclose and fit the circular periphery of the bottle, the basin being sufficiently full as to its bottom curvature to receive either side 6 of the bottle or canteen, the parts preferably fitting snugly.

The basin has on its rim a hook 7 to engage the loop 2 at the corresponding point on the bottle or canteen and at or near the opposite end of the long diameter, a loop or ring 8 adapted to register with the filler opening 3 in the neck when the side of the bottle is nested in the basin. The filler opening 3 has a plug or cork 10, shown as screw-threaded to engage a corresponding thread in the filler opening.

To assemble the parts, the hook 7 is passed through the loop 2 and the basin swung against the side of the bottle, causing the side of the bottle to nest closely in the basin until the loop 8 registers with the filler opening 3 of the bottle. The bottle having been filled, the plug 10 is then inserted in the filler opening, being passed through the loop 8 so that the parts are locked in nested or assembled position.

The manner of use is obvious. The plug is withdrawn, the basin swung free and unhooked and filled with the necessary amount of water, the plug being of course replaced to hold the remaining water for further use. The basin and canteen thus assembled are packed in a suitable canvas bag, any other desired equipment being packed with them, as soap, towel, hand-brush and the like.

I have thus described my invention specifically and in detail in order that its nature and operation may be fully understood; however, the specific terms herein are used descriptively rather than in their limiting sense and the scope of the invention is defined in the claims:

1. In combination, a canteen having a substantially circular periphery and elongated cross-section, a basin adapted to receive and nest with the shallow side of the canteen and having a rim to fit over the long periphery of the canteen, the canteen having a filler neck on the periphery and the basin having a fastening device on its rim to engage the neck when the side of the canteen is nested in the basin, and coöperating fastening means approximately opposite the filler opening on both the basin and canteen.

2. In combination, a canteen having a substantially circular periphery, a basin adapted to receive and nest with a shallow side of the canteen and having a rim to fit over the long periphery of the canteen, the canteen having a filler opening on the periphery and a neck surrounding the opening and the basin having means on its rim for engaging said neck to hold the members in nested position, the canteen and the basin having fastening means substantially opposite said neck.

Signed by me at Baltimore, Maryland, this 5th day of March, 1918.

BILLUPS HARRIS.

Witnesses:
 ZELLA KUHN,
 ALICE G. DONEGAN.

Copies of this patent may be obtained for five cents each, by addressing the "Commissioner of Patents, Washington, D. C."